United States Patent [19]
Sugimori et al.

[11] Patent Number: 5,223,929
[45] Date of Patent: Jun. 29, 1993

[54] TELEVISION SYSTEM

[75] Inventors: Yoshio Sugimori, Tokyo; Yoshihide Kimata, Machida, both of Japan

[73] Assignee: Nippon Television Network Corporation, Tokyo, Japan

[21] Appl. No.: 674,259

[22] Filed: Mar. 25, 1991

[30] Foreign Application Priority Data

Mar. 24, 1990 [JP] Japan .................. 2-74456

[51] Int. Cl.$^5$ .................. H04N 7/00; H04N 7/04; H04N 11/00
[52] U.S. Cl. .................. 358/141; 358/12
[58] Field of Search .................. 358/141, 12, 140, 11

[56] References Cited

U.S. PATENT DOCUMENTS

| | | | |
|---|---|---|---|
| 4,551,754 | 11/1985 | Meise et al. | 358/180 |
| 4,839,720 | 6/1989 | Isnardi | 358/12 |
| 4,897,722 | 1/1990 | Flory | 358/141 |
| 5,068,728 | 11/1991 | Macovski | 358/141 |

FOREIGN PATENT DOCUMENTS

| | | |
|---|---|---|
| 2-113688 | 4/1990 | Japan . |
| 2-156785 | 6/1990 | Japan . |
| 9009719 | 8/1990 | Japan . |

Primary Examiner—James J. Groody
Assistant Examiner—Safet Metjahic
Attorney, Agent, or Firm—Schwartz & Weinrieb

[57] ABSTRACT

The present invention relates a television system by which it is possible to obtain a wide picture with improved vertical resolution over the entire screen of a television receiver without deteriorating the picture quality by avoiding multiplexing of the high-frequency component of the side panel upon the broadcasting screen, and more particularly to a television system which transmits a television signal of having an aspect ratio of 9:16 by the same raster as that of a conventional type television signal with an aspect ratio of 3:4 and which minimizes the black band-like portions appearing upon the upper and lower portions of the screen of a conventional type television receiver.

3 Claims, 7 Drawing Sheets

ARRANGEMENT OF IMAGE TRANSMITTER

SCHEMATICAL ILLUSTRATION OF PRINCIPLE OF THE INVENTION

DRAWINGS TO EXPLAIN SIGNAL OVERLAPPING

ARRANGEMENT OF IMAGE TRANSMITTER

LETTER BOX TYPE

TELEVISION SYSTEM

FIELD OF THE INVENTION

The present invention relates to a television system, and more particularly to a television system which transmits television signals having an aspect ration of 9:16 by means of the same raster as that of a conventional type television signal having an aspect ratio of 3:4 and which minimizes the black band-like portions appearing upon upper and lower portions of the screen of a conventional type television receiver.

BACKGROUND OF THE INVENTION

When television signals having an oblong aspect ratio, particularly those signals for wide screen televisions and having an aspect ratio of 9:16, are broadcast and received by means of television receivers for such exclusive use, realistic and exciting pictures can be obtained. However, when such signals are received by means of conventional type television receivers which are normally adapted to receive television signals having an aspect ratio of 3:4, the picture is not received or displayed upon the right and left ends of the screen (or is received or displayed upon only either the right end or the left end if the signals are received) so as not to have no-picture or black band portions or sectors upon the upper and lower portions of the screen as shown in FIG. 7(b). These ends portions are called "side panels". FIG. 7(a) illustrates the case where the picture is received and displayed upon the entire area of the wide screen television so as to extend between the left and right sides of a conventional type television set, yet there also exists or is developed no-picture sectors or regions within the upper and lower portions of the screen. This state is called the "letter box type picture or display". Because the signals for a wide screen television set or monitor cannot be completely or properly received upon a conventional type television set, another type of television system is provided, which is in effect, a compromise between the aforenoted two different types of systems or display modes and which can in fact be normally received by wide means of a wide screen television set or monitor.

In the case illustrated within FIG. 7C, side panels exist to some extent, and upper and lower no-picture or black band regions or sectors are also present but the same extend to relatively short distances. However, in order to receive wide screen television pictures upon a television set or monitor which is especially designed for such exclusive use, it is necessary to transmit television picture signals having such side panels by some means and to subsequently process and display these signals within such television set or monitor.

In order to attain such an objective, it has been proposed to divide the frequency band for the side panel signals into low and high bands and to broadcast the picture signals by means of multiplexing them by separate methods. Based upon such a concept, a system is not under experimental study at the David Sarnoff Institute in the United States. By means of this system, high frequency components are diffused throughout the entire picture to be broadcast through means of frequency multiplexing, and low frequency components are compressed and inserted into the left and right ends of the raster. When these signals re received by means of a television receiver especially designed for such exclusive use, the high frequency and low frequency components synthesized and displayed upon the wide screen television monitor. When these signals are received upon a normal or conventional television receiver, the picture is displayed with the side panels partially omitted.

When the signals for the side panels are divided into the two frequency bands of the high and low frequencies, a high-pass filter and a low-pass filter are used, but it is impossible to obtain ideal cut-off frequency characteristics. Therefore, it is unavoidable to develop overlapped regions in connection with the filter characteristics near the cut-off frequency, and such band, such as, for example, 0.5 MHz, cannot be neglected when the above signals rae set by means of multiplex transmission. The high frequency components of the side panels, generated by means of such filters, have a wide band and cannot be received within the no-picture or block band sectors within the upper and lower portions of the screen. Unavoidably, these signals are therefore diffused over the entire screen of the television set or monitor as a result of being multiplexed at the David Sarnoff Institute. Accordingly, interference occurs upon the screen and the picture quality is deteriorated in this system because the high frequency components of the side panels, originally irrelevant, are multiplexed upon the screen.

OBJECT OF THE INVENTION

The object of the present invention is to offer a television system, by which it is possible to overcome the above disadvantages and to obtain wide picture reception and display of the same with an improved vertical resolution over the entire screen of the television receiver without deteriorating the picture quality by avoiding the multiplexing of the high-frequency components of the side panels upon the broadcasting screen.

Various other objects, features, and attendant advantages of the present invention will become more fully appreciated from the following detailed description, when considered in connection with the accompanying drawings, in which like reference characters designate like or corresponding parts throughout the several views, and wherein:

DETAILED DESCRIPTION OF THE ILLUSTRATED EMBODIMENTS

Figure 1C:
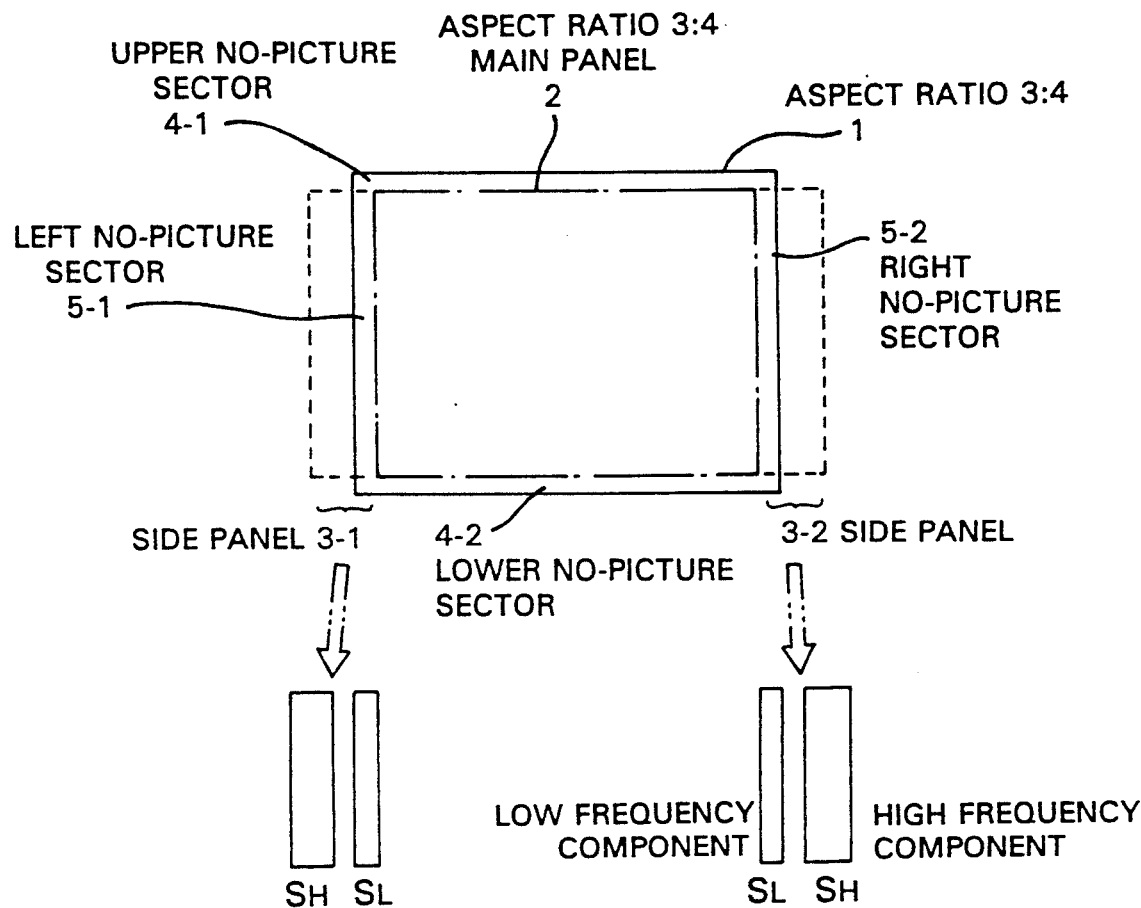
FIG. 1 schematically illustrates the operating principle of the television system constructed according to this invention, and wherein, in particular, FIG. 1(a) schematically illustrates overlapped television screens having aspect ratios of 3:4 and 9:16.
FIG. 1(b) illustrates the high and low frequency components of the side panel signals, and FIG. 1(c) schematically illustrates the screen or monitor picture when the high frequency components of the side panel signals are introduced into the upper/lower no-picture sectors and the left/right no-picture sectors.
Figure 1C:
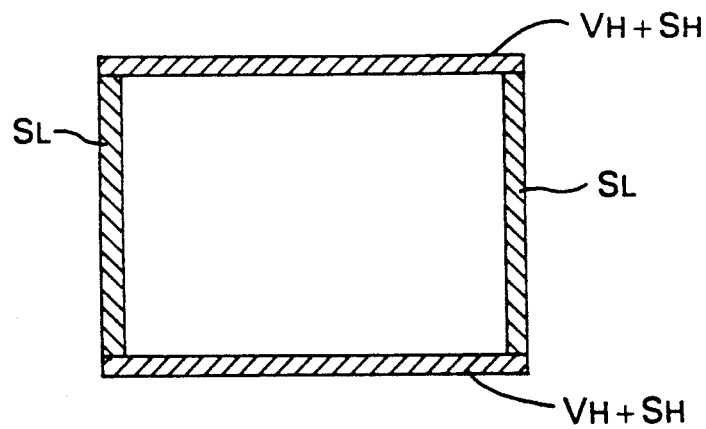

Referring now to the drawings, and more particularly to FIG. 1(a) thereof, 1 represents a television monitor or screen with an aspect ratio of 3:4, 2 represents a main panel, 3-1 and 3-2 are side panels, 4-1 and 4-2 are upper and lower no-picture sectors, and 5-1 and 5-2 are left and right no-picture sectors.

FIG. 1(a) schematically illustrates the operating principle of a television system according to this invention. In FIG. 1(a) solid line 1 designates a screen with an aspect ratio of 3:4, and one-dot chain line 2 represents a screen with an aspect ratio of 3:4, illustrated in the middle of a wide screen with an aspect ratio of 9:16. The broken lines 3-1 and 3-2 illustrate side panels and constitute the screen with the aspect ratio of 9:16 when taken together with the screen of the one-dot chain line 2. In connection with the screen with the aspect ratio of 3:4, 4-1 and 4-2 represent the upper and lower no-picture sectors, and 5-1 and 5-2 represent the left and right no-picture sectors. Output signals from the camera used in connection with the screen having an aspect ratio of 9:16 are transmitted to the raster with an aspect ratio of 3:4, and the picture is seen upon a conventional type television receiver with no-picture sectors formed within the upper and lower portions thereof as well as within the left and right portions thereof. In connection with a television receiver which is used exclusively to view wide screen pictures, side panel signals are inserted at the predetermined points or locations so as to convert the signals as described later into side panel picture regions. Namely, the signals comprising the side panels are divided into high frequency components and low frequency components as shown in FIG. 1(b). Next, as shown in FIG. 1(c), high frequency components are introduced into the upper/lower no-picture sectors, and low frequency components are introduced into left/right no-picture sectors. Here, "/" means both "and" and "or". On the other hand, in order to increase the vertical resolution of the original picture over the entire television screen, the high frequency component signals in the vertical direction are overlapped upon the high frequency component signals of the side panels, or alternatively, signals are transmitted separately for the upper/lower no-picture sectors.

In accordance with the second aspect of the invention, signal components are separated by thinning out pixels as a means to obtain the high frequency component and the low frequency component of the side panels. Specifically, "n" pixels (n<m) which are obtained by thinning the same out from "m" horizontal pixels with equal spacings defined therebetween upon the end of the original picture are used for the high frequency component signals in the horizontal direction. Similarly, the low frequency component signals in the horizontal direction are obtained as the signals consisting of the remaining "m−n" pixels.

The main panel of the screen is placed at the center of the raster, and the low frequency component of the side panels is transmitted to the right and left ends of the raster. The high frequency component signals of the side panels are divided between the units, each consisting of several dozens of lines, by means of a scanning line, and these signals are transmitted by aligning the same with the upper and lower no-picture sectors. These signals rae multiplexed with the signals for improving the vertical resolution over the entire screen and are transmitted as such.

If it is supposed that the number of horizontal pixels comprising the side panels is "m", it is appropriate that approximately ⅔ of the pixels is assigned to the high frequency components, and about ⅓ to the low frequency components.

In the conventional type television receiver, pictures are received with upper and lower no-picture sectors formed thereof and side panels not having any normal pictures, but the picture is relatively reduced to some extent and there is not substantial hindrance.

In connection with a television receiver which is to be used only for the reception of wide screen picture, it is preferable to provide a circuit for deleting the above signals, to perform signal processing contrary to the above and to add the pictures to the side panels. In order to utilize the signals for improving the vertical resolution of the picture over the entire screen, picture quality can be improved by furnishing a circuit which deletes such signals.

Figure 2A:
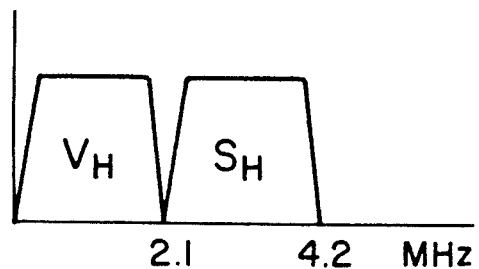
FIG. 2(a)-2(e) schematically illustrate the overlapping of the signals in accordance with multiplexing techniques employed in connection with an embodiment of the invention.
Figure 2B:
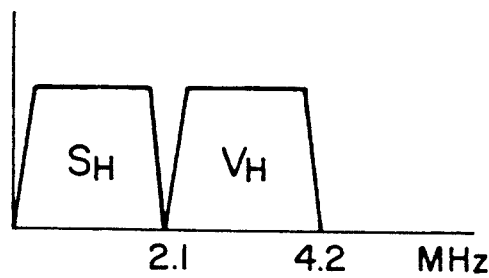
Figure 2C:
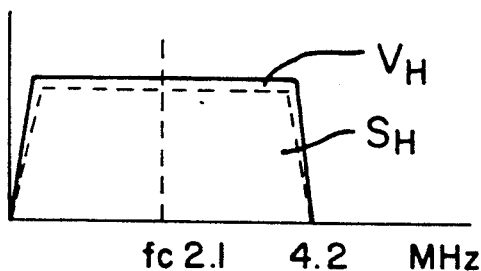
Figure 2D:
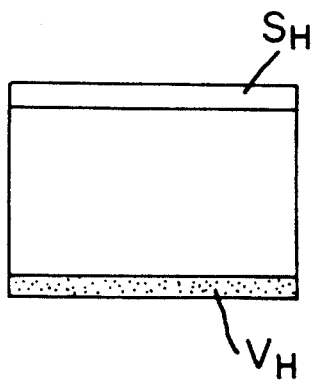
Figure 2E:
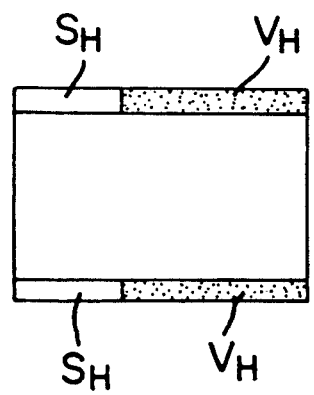

A description will now be given with respect to the overlapping of the signals for improving the vertical resolution of the signals of the raster an aspect ratio of 3:4. It is supposed that the frequency bands of the original picture displayed upon the wide screen and the side panels thereof are 4.2 MHz. The values of "m" and "n" are determined in such a manner that "n" pixels upon the side panels are equal to (⅔) m in relation to "m" pixels in the horizontal direction upon the end portions extending laterally outwardly from or beyond the normal screen. The frequency components of the side panels obtained by separating a part of the pixels, which constitute the side panels, should have the frequency band of 4.2 MHz if the constituent pixels are packed closely and the sampling frequency as described later is used. When the time base of this signal is stretched so as to be doubled in the horizontal direction, the signal band is approximately 2.1 MHz. Multiplexing is performed upon this signal band and the band (approximately 2.1 MHz) of the signal for improving the vertical resolution of the entire screen picture (referred to as "$V_H$"), and these signals are inserted into the upper and lower no-picture sectors of the raster. FIGS. 2(a) and 2(b) show such examples of frequency multiplexing. These figures represent the case where the high frequency components $S_H$ of the side panels are aligned upon the high frequency side (FIG. 2(a)), and the case where they are aligned upon the low frequency side (FIG. 2(b)). FIG. 2(c) shows the case where a carrier wave $f_c$ of approximately 21. MHz is used and quadrature modulation is performed. FIG. 2(d) illustrates the case where time division multiplexing is performed. The high frequency components of the side panels are inserted into the upper no-picture sector and signals $V_H$ for improving the vertical resolution of the entire screen picture is inserted into the lower no-picture sector. Furthermore, FIG. 2(e) illustrates another case of time division multiplexing. The high frequency component $S_H$ is placed upon the initial portion of the raster, the signal $V_H$ for improving the vertical resolution extends form the middle portion to the opposite end, and both signals are inserted upon the upper and lower no-picture sectors.

The thinning-out of the pixels will be described later, but now a description will be given with respect to the sampling frequency to be used in connection with the thinning process. If it is assumed that the frequency band of the original signal displayed upon the wide screen is 42. MHz, the sampling frequency is selected so as to be twice as much as such band of the signal transmission system, that is, 8.4 MHz. In this case, frequency band of both the signals $S_H$ and $S_L$ of the side panels is ½ of the sampling frequency according to the sampling theorem, that is, 4.2 MHz. The $S_L$ signals thus obtained are connected to both ends of the main panel and are transmitted accordingly. The $S_H$ signals inserted in similarly to the upper and lower no-picture sectors of the screen and are likewise transmitted accordingly.

Figure 3:
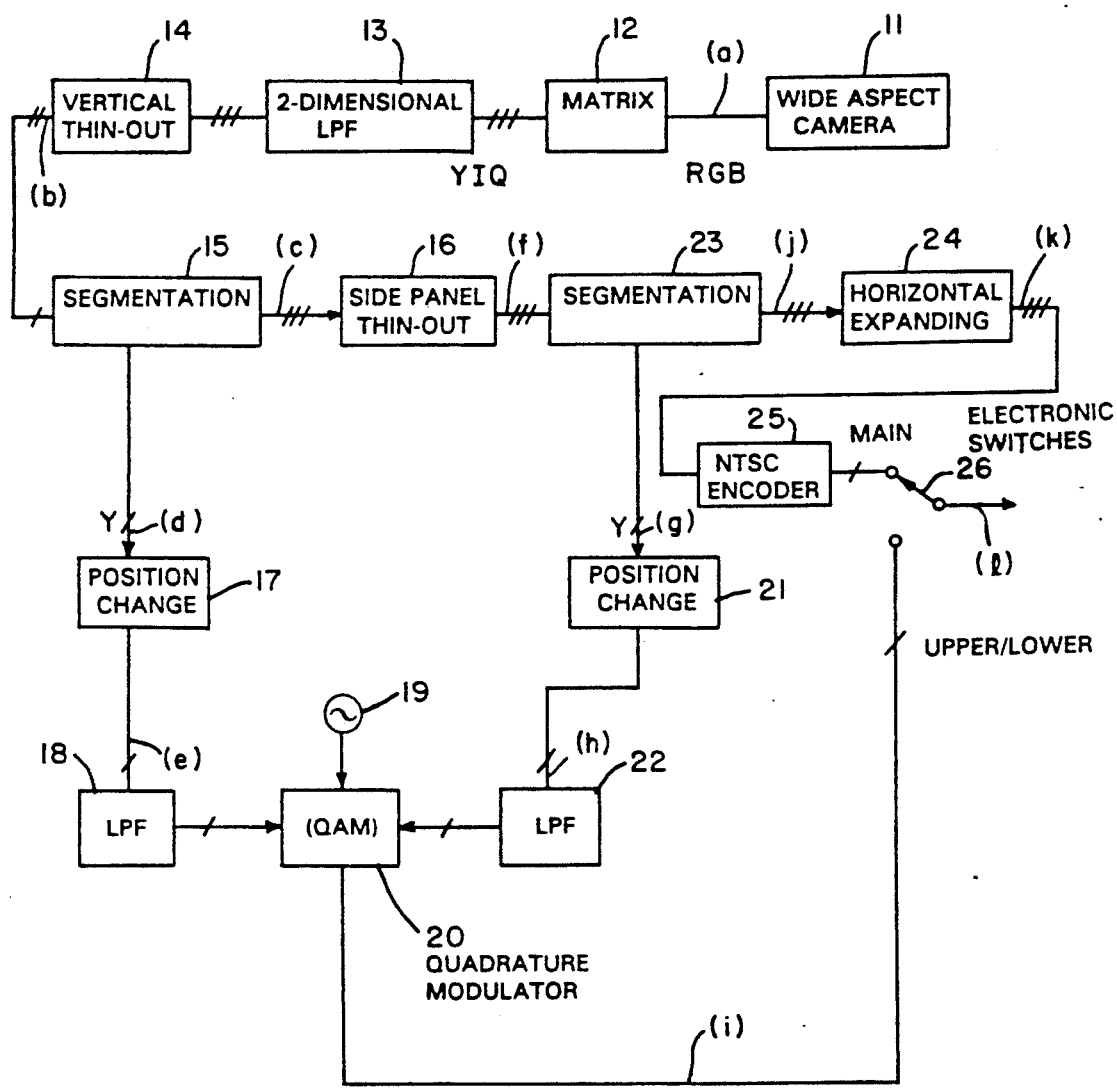
FIG. 3 is a schematic drawing of the arrangement of the circuit for transmitting the wide screen picture.
Figure 4A:
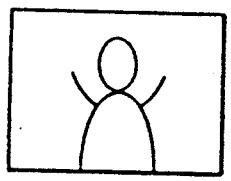
FIG. 4(a)-4(i) illustrate the image status within each of the components of FIG. 3.
Figure 4B:
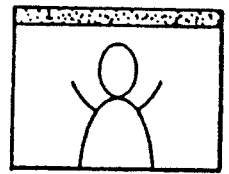
Figure 4C:
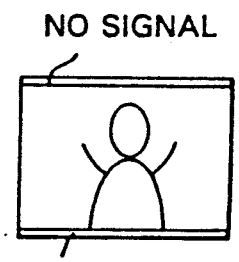
Figure 4D:
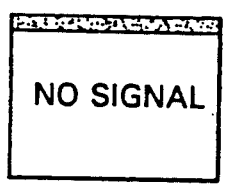
Figure 4E:
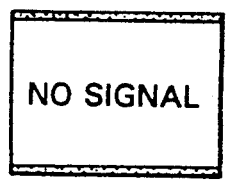

Next, a description will be given in connection with the operation of the transmitter for transmitting the signals. FIG. 3 illustrates a circuit used in connection with a camera for receiving images to be displayed upon a wide screen television set or monitor for processing of the same. The reference character 11 represents a wide screen camera, 12 is a matrix, 13 is a 2-dimensional low-pass filter, 14 is a vertical signal thin-out circuit, 15 is a screen dividing (segmentation) circuit, 16 is a thin-out circuit for the side panels, 17 is a position changing circuit for the signals upon the screen, 18 is a low-pass filter, 19 is an oscillator, 20 is a quadrature modulator, 21 is a position changing circuit, 22 is a low pass filter, 23 is a screen dividing or segmentation circuit, 24 is a horizontal picture expanding circuit, 25 is an NTSC encoder, and 26 is a signal output terminal. The reference character (a) represents a picture image when the output of the camera 11 is displayed upon a conventional type television monitor and it is indicated as such in FIG. 4(a). FIG. 4(a) is compressed by approximately 4/5 in the horizontal direction. The signal shown in FIG. 3 (a) is converted to a YIQ signal by means of the matrix 12 and is applied to the two-dimensional low-pass filter 13. This filter 13 performs processing so as to eliminate oblique region of the picture image. More particularly, the oblique region is the frequency band which extends from "(5/6)×total number of lines" to the total number of lines in the vertical direction, including the region covering the middle horizontal direction. Next, in the vertical signal thin-out circuit 14, processing is performed as shown in FIG. 4(b). Here, for example, 5/6 of all of the four hundred eighty scanning lines are left upon the main panel, while 1/6 are thinned out. The vertical high frequency components thus obtained are placed upon the upper portion of the raster. The output of the thin-out circuit 14 then divided by means of the screen dividing (segmentation) circuit 15, and the main panel or picture image is then moved to the center of the screen and the image signals is then transmitted the thin-out circuit 16 as shown in FIG. 3 and in FIG. 4(c). The other screen is shown in FIG. 4(d), and its position is changed by means of the position changing circuit 17 and is developed as shown in FIG. 4(e). More particularly, the information relating to the upper half of the original picture is disposed upon the no-picture sector within the upper portion of the screen, and the information relating to the lower half of the original picture is disposed upon the no-picture sector of the screen. Subsequently, this signal is correlated with the signal of the modulator 20, by limiting the horizontal band to about approximately ½, by means of the low-pass filter 18.

Now, a description will be given with respect to the thinning-out of the side panels. The signals corresponding to the picture of FIG. 4(c) only relate to the thinning-out of the side panels formed upon the left and right end portions of the screen by means of the circuit 16. That is, more particularly, the pixels (a b c a b c . . . ) constituting the side panels displayed upon the screen of section A of FIG. 5, which corresponds to the picture of FIG. 4(c), are thinned out in accordance with the ratio of 2:1 as illustrated in section B of FIG. 5. In this case, the sampling frequency used is twice as high as the signal transmission band frequency of 4.2 MHz, that is 8.4 MHz. Section C of FIG. 5 illustrates the case where only the pixel "b" is left, and section D of FIG. 5 represents the case where the remaining pixels are packed without gaps therebetween. These signals are formed into a picture, which is horizontally compressed to ⅓ of its horizontal size of the side panels only within the band frequency wherein the horizontal band is ½ of the above sampling frequency. Section E of FIG. 5 illustrates the case where the pixel "a" and the pixel "c" are left, and if the gaps are eliminated, it is formed into the picture as shown in Section F of FIG. 5. This signal is the same as the signal of the band before the thinning-out of the main panel and the side panels, and the signal is formed into a picture which is compressed to ⅔ of its horizontal size. When the picture or signal of Section F of FIG. 5 is aligned with respect to both sides of the picture formed in accordance with the signals or pictures of the sections F-D-main panel-D-F of FIG. 5, it is the same as that shown in FIG. 4(f). In this case, the pixels related to the left side panels of the screen are aligned upon the left side of the screen and those related to the right side panel are aligned upon the right side of the screen.

Figure 4F:
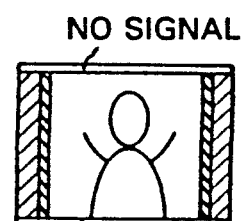
Figure 4G:
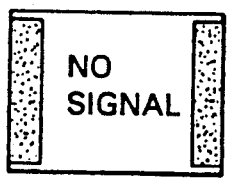
Figure 4H:
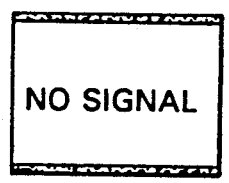
Figure 4I:

Next, the signals of FIG. 4(f) are divided in half within the dividing circuit 23. The part of the picture signal corresponding to Section D of FIG. 5 is supplied to the expanding circuit 24 of FIG. 3 and illustrated in FIG. 4(j), and the part of the picture signal corresponding to Section F of FIG. 5 is supplied to the position changing circuit 21 of FIG. 3. This signal is shown in FIG. 4(g). Within the position changing circuit 21, the position of the picture upon the screen is with respect to the upper and lower no-picture sectors of the screen. In order to reduce the horizontal bandwidth of this signal to ½ of the frequency of 4.2 MHz, that is 2.1 MHz, to the horizontal size thereof is extended so as to be twice as long as the initial size. This signal is shown in FIG. 4(h). By limiting the horizontal band frequency or signal to approximately ½ of the original signal band or frequency by means of the filter 22, the oscillator 19 able to be used to generated and transmit the carrier wave to the modulator 20. The oscillating frequency of the oscillator 19 is set at 2.1 MHz, that is, approximately ½ of the upper limit of 4.2 MHz of the original signal band. The output signal or picture of the modulator 20 is illustrated in FIG. 4(i), and this signal is supplied to the electronic switch 26.

Figure 4J:
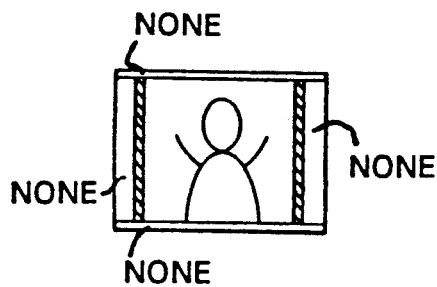
Figure 4K:
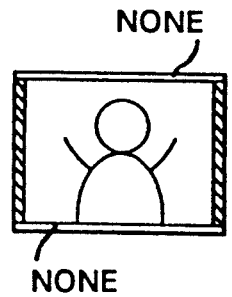
Figure 4L:
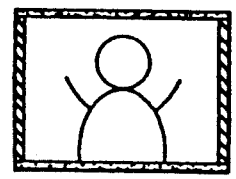
Figure 5:
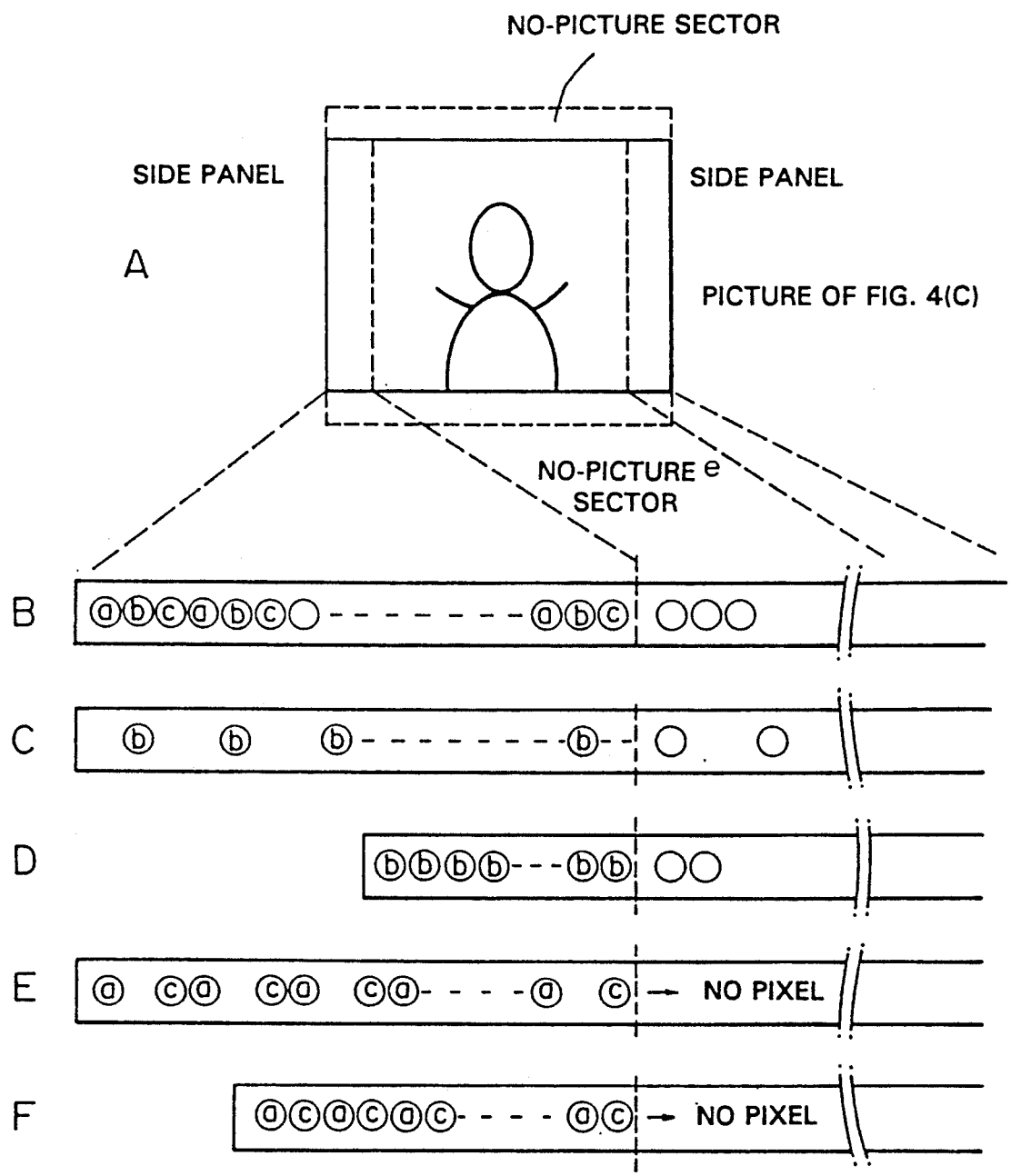
FIG. 5 schematically illustrates the operation of the circuit of FIG. 3 so as to thin out the pixels.

On the other hand, the signal or picture illustrated in FIG. 4(j) is extended in horizontal size by means of the expanding circuit 24 and is converted tot he signal of FIG. 4(k). The upper and lower no-picture sectors of the screen used to display this signal or picture thereof have no signal. This signal is converted into a composite signal at the encoder 25 and is applied to the electronic switch 26. The electronic switch 26 serially outputs the image signals so as to continuously change the main panel and the upper and lower no-picture sector images or pictures. In accordance with the displayed image or picture signal of FIG. 4(l), both signals are simultaneously registered or displayed. When this composite signal is received upon a conventional type receiver, it is received as a picture having no-picture sectors, disposed upon upper and lower portions of the screen, and this is transmitted because so-called compatibility is provided.

Figure 6:
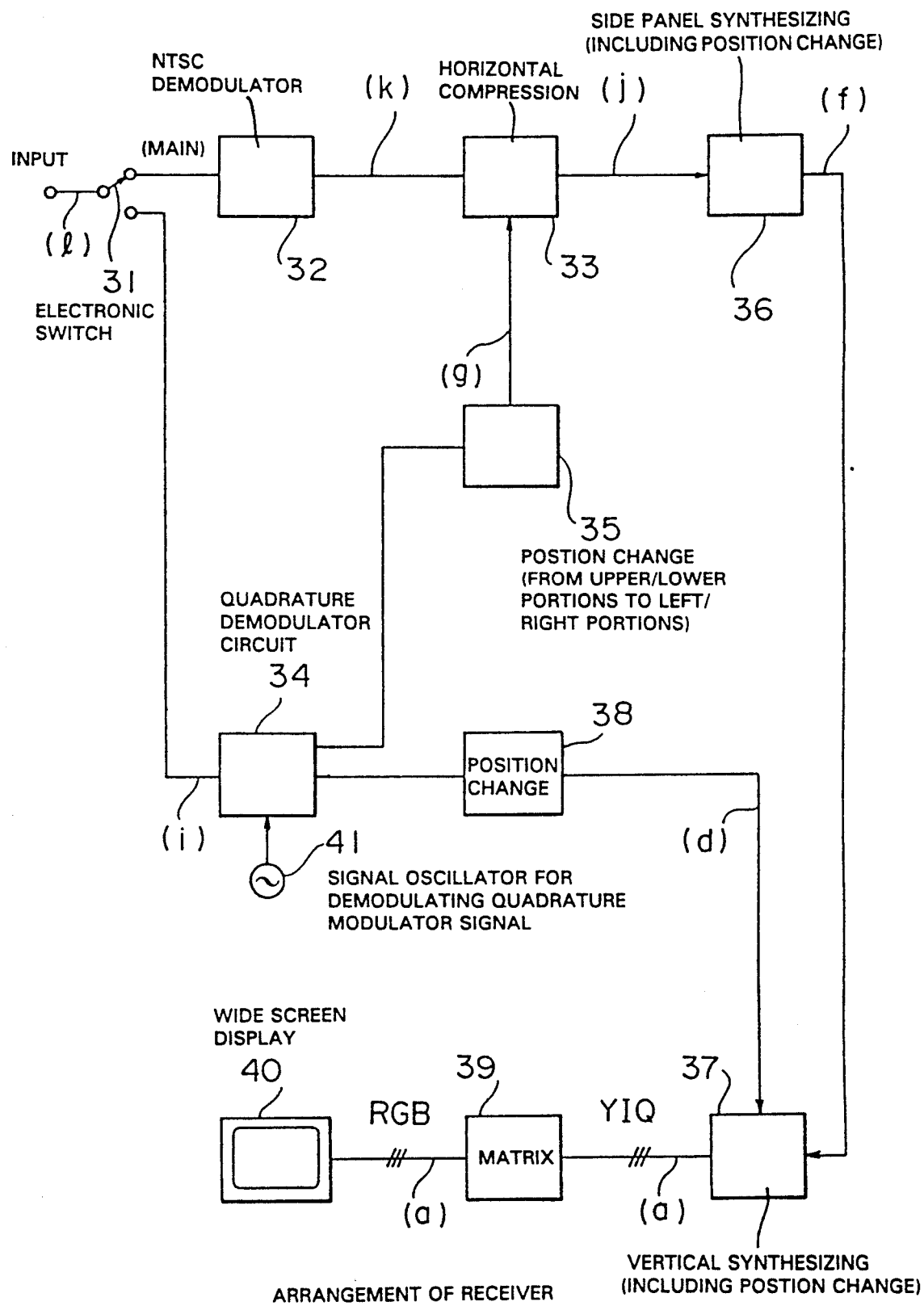
FIG. 6 schematically illustrates the arrangement of the wide screen receiver.
Figure 7A:
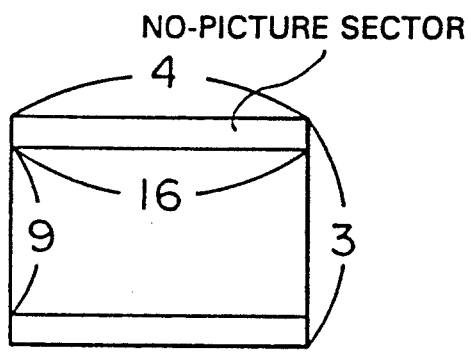
FIG. 7(a)—7(c) schematically illustrate each of the image receiving methods or modes of the television receivers.
Figure 7B:
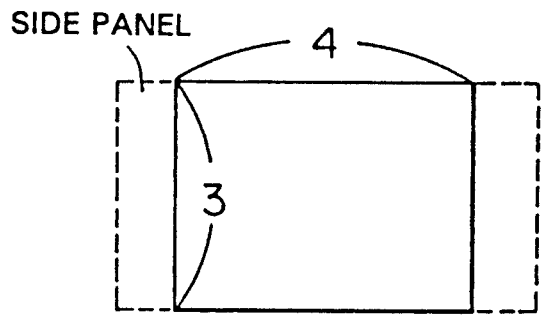
Figure 7C:
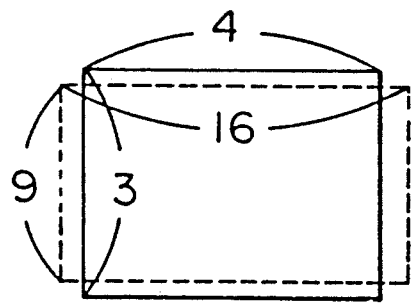

Next, a description will be given in connection with a wide screen receiver. FIG. 6 shows the arrangement of the receiver, where 31 represents an electronic switch, 32 designates an NTSC demodulator, 33 indicates a horizontal size compression circuit, 34 represents a quadrature signal demodulator circuit, 35 designates a position changing circuit, 36 represents a synthesizing circuit for the side panel, 37 indicates a vertical signal synthesizing circuit, 38 represents a position changing circuit, 39 represents a matrix, 40 designates a wide screen display monitor, and 41 represents a signal oscillator for demodulating a quadrature modulator signal. When the signal from the transmitting circuit of FIG. 3 is received, it is divided into upper and lower no-picture sectors and a main screen signal by means of the electronic switch 31. The main screen signal is demodulated by means of the demodulator 32 and is converted into a YIQ signal. This is the same signal or picture image as is illustrated within FIG. 4(k). Next, the signal is compressed by means of the compression circuit 33, and the same signal as that of FIG. 3(j) is obtained. On the other hand, the signals disposed within the upper and lower portions are demodulated by means of the quadrature demodulator 34, and the signals related to the vertical high frequency information of the entire screen and side panels are restored. In this case, the oscillation output of the oscillator 41 is applied to the demodulator 34. The signals relating to the side panels are changed from their position within the upper no-picture sector to the left and right sides of the screen by means of the position changing circuit 35 and are converted into to the same signals as those of FIG. 4(g). Then, these signals are synthesized with the signals of FIG. 3(j) as compressed with in the synthesizing circuit 36, and the signals of FIG. 3(f) are obtained. Furthermore, these signals are synthesized with the signals (corresponding to those of FIG. 3(d)), the position of the vertical high frequency information is changed at the position changing circuit 38, and the signals of FIG. 3(a) are obtained. Subsequently, these signals are applied to the matrix circuit 39. When displayed upon the display monitor 40, a wide screen can be obtained.

The vertical band of the image thus reproduced is the same as that of the original signal upon the transmitter side. In addition, the side panels are disposed within the same horizontal frequency and as that of the main panel, that is the same band as that of the original signal: 4.2 MHz.

As described above, it is possible according to the present invention to improve the vertical resolution within a wide screen receiver and to obtain the same wide image as the originally transmitted image without any hindrance with respect to the picture received, although the picture is a little smaller than that displayed upon a conventional type receiver. The circuit configuration is also relatively simple.

Obviously, many modifications and variations of the present invention are possible in light of the above teachings. It is therefore to be understood that within the scope of the appended claims, the present invention may be practiced otherwise than as specifically described herein.

What we claim is:

1. A television system for inserting and transmitting signals to a raster having no-picture sectors so that an original image signal having an aspect ratio of 9:16 can be received with smaller no-picture sectors by means of a receiver having a screen having an aspect ratio of 3:4, comprising:
   first means for developing first horizontal high frequency component signals derived from left and right ends of said original image signal;
   second means for developing a second signal for improving the vertical resolution of said original image signal;
   third means for developing third horizontal low frequency component signals derived from said left and right ends of said original image signal; and
   means for overlapping and inserting said first horizontal high frequency component signals and said second vertical resolution improving signal into upper and lower no-picture sectors of said screen, and for inserting said third horizontal low frequency component signals into left and right no-picture sectors of said screen.

2. A television system as set forth in claim 1, wherein:
   said left and right ends of said original image signals comprise "m" pixels equally spaced with respect to each other in the horizontal direction of said original image; and
   said first horizontal high frequency component signals comprise "n" pixels generated by thinning out means from said left and right ends of said original image signals, wherein n<m.

3. A television system as set forth in claim 2, wherein:
   television signals are transmitted in accordance with a signal transmission band having a predetermined frequency; and
   said thinning out means for thinning out said "n" pixels comprising said first horizontal high frequency component signals comprises a sampling frequency which is approximately two times said predetermined frequency of said signal transmission band.

* * * * *